US011034525B2

(12) United States Patent
Wright

(10) Patent No.: US 11,034,525 B2
(45) Date of Patent: Jun. 15, 2021

(54) CONVEYOR WEAR MEASUREMENT

(71) Applicant: Baseline Asset Technologies Pty Ltd, Bedfordale (AU)

(72) Inventor: Kelvin Wright, Bedfordale (AU)

(73) Assignee: Baseline Asset Technologies Pty Ltd, Bedfordale (AU)

( * ) Notice: Subject to any disclaimer, the term of this patent is extended or adjusted under 35 U.S.C. 154(b) by 0 days.

(21) Appl. No.: 16/769,963

(22) PCT Filed: Dec. 10, 2018

(86) PCT No.: PCT/AU2018/051318
§ 371 (c)(1),
(2) Date: Jun. 4, 2020

(87) PCT Pub. No.: WO2019/113637
PCT Pub. Date: Jun. 20, 2019

(65) Prior Publication Data
US 2020/0391956 A1     Dec. 17, 2020

(30) Foreign Application Priority Data

Dec. 11, 2017  (AU) .............................. 2017904980

(51) Int. Cl.
*B65G 43/02*    (2006.01)
*B65G 15/30*    (2006.01)
(52) U.S. Cl.
CPC ............. *B65G 43/02* (2013.01); *B65G 15/30* (2013.01); *B65G 2203/0275* (2013.01);
(Continued)

(58) Field of Classification Search
CPC .............................. B65G 15/30; B65G 43/02; B65G 2203/0275; B65G 2203/0283;
(Continued)

(56) References Cited

U.S. PATENT DOCUMENTS

| 7,864,067 B2 * | 1/2011 | Smith | B65G 43/00 340/676 |
| 8,127,918 B2 * | 3/2012 | Warner | B65G 43/02 198/810.03 |

(Continued)

FOREIGN PATENT DOCUMENTS

| CN | 206417548 U | 8/2017 |
| CN | 105692120 A | 11/2017 |

(Continued)

OTHER PUBLICATIONS

International Search Report from corresponding International Patent Application No. PCT/AU18/51318, dated Mar. 27, 2019.

*Primary Examiner* — Gene O Crawford
*Assistant Examiner* — Keith R Campbell
(74) *Attorney, Agent, or Firm* — Kusner & Jaffe

(57) ABSTRACT

A conveyor belt condition monitoring apparatus is U-shaped, with two parallel arms arranged to extend across a conveyor belt from the side. The arms include ultrasonic sensors arranged to measure the distance to respective surfaces of the conveyor belt. One arm includes an eddy-current sensor arranged to measure the distance to a metallic core of the belt. The apparatus is arranged to be moved across the belt to provide a profile of belt condition across the width of the belt.

21 Claims, 4 Drawing Sheets

(52) U.S. Cl.
CPC ............... *B65G 2203/0283* (2013.01); *B65G 2203/042* (2013.01); *B65G 2207/48* (2013.01)

(58) Field of Classification Search
CPC ........ B65G 2203/042; B65G 2203/043; B65G 2203/045; B65G 2207/48
See application file for complete search history.

(56) References Cited

U.S. PATENT DOCUMENTS

| | | | |
|---|---|---|---|
| 8,618,929 B2* | 12/2013 | Ganapathy | B65G 43/02 340/539.1 |
| 8,991,594 B2* | 3/2015 | Nakamura | B65G 43/02 198/810.02 |
| 9,988,217 B2* | 6/2018 | Hou | B65G 43/02 |
| 10,377,574 B2* | 8/2019 | Hou | B65G 43/02 |
| 2017/0313523 A1 | 11/2017 | Hou | |
| 2020/0262657 A1* | 8/2020 | Sakaguchi | G08B 21/182 |

FOREIGN PATENT DOCUMENTS

| | | | | |
|---|---|---|---|---|
| JP | H02-266381 | 10/1990 | | |
| WO | WO 2013/053013 A1 | 4/2013 | | |
| WO | WO-2013053013 A1 * | 4/2013 | ............ | B65G 43/02 |
| WO | WO 2019/113637 A1 | 6/2019 | | |

* cited by examiner

CONVEYOR WEAR MEASUREMENT

FIELD OF THE INVENTION

The present invention relates to the measurement of wear on conveyor belts. In particular, the present invention relates to a re-deployable tool for measuring wear.

BACKGROUND TO THE INVENTION

Australian patent number 2012321080 describes an apparatus for measuring wear on a conveyor. The apparatus includes sensors for measuring overall conveyor belt thickness, and also thickness from an outer surface to a central core.

This system, while efficacious, represents a significant cost in fixed condition monitoring equipment for a single conveyor belt. In a mineral processing environment where there may be many conveyors in operation, the use of fixed monitoring systems in relation to each conveyor may be cost-prohibitive.

It is therefore desirable to provide a system for conveyor belt condition monitoring which may be deployed across a number of different conveyors. Such a system must be sufficiently lightweight for ready deployment, it must be reasonably easy to calibrate, it must produce results which are repeatable and consistent, and it must not introduce hazards into the conveyor environment.

The present invention seeks to provide a system for deploying a portable conveyor belt condition monitoring apparatus in light of these considerations.

SUMMARY OF THE INVENTION

According to a first aspect of the present invention there is provided a conveyor belt condition monitoring apparatus having a body portion and two arms, the arms being parallel to each other and extending away from the body portion, a gap being defined between the two arms, each arm including at least one first sensor, such that the apparatus can be located with a portion of a conveyor belt located in the gap, with one first sensor oriented towards an upper face of the conveyor belt and one first sensor oriented towards a lower face of the conveyor belt, the apparatus being moveable relative to the conveyor belt.

Preferably, the apparatus is arranged to move relative to the conveyor belt in a direction perpendicular to a direction of motion of the conveyor belt.

The first sensors may be arranged to determine a distance from the arm to a respective face of the conveyor belt. In a preferred embodiment of the invention, the first sensors are ultrasonic sensors.

At least one arm may include a second sensor arranged to determine a distance from the arm to a core of the conveyor belt. The second sensor is preferably an eddy-current sensor.

It is preferred that the second sensor locates around at least one first sensor. In a preferred embodiment, the second sensor is annular, with at least one first sensor directed through a center of the second sensor.

In its broadest sense, the second sensor defines a boundary of a two-dimensional area (that is, a plane boundary), with the first sensor being located within this boundary. It will be appreciated that the second sensor may, for instance, be C-shaped.

At least one arm may include a third sensor arranged to determine the temperature of the belt. The third sensor is preferably an infra-red pyrometer.

The apparatus may include an additional edge detecting sensor. The edge detecting sensor may be associated with the body portion of the apparatus, and is preferably arranged to determine a distance from the body portion to an edge of the conveyor belt. In a preferred embodiment of the invention the edge detecting sensor is an ultrasonic sensor.

According to a second aspect of the present invention there is provided a conveyor belt condition monitoring apparatus supporting structure, the supporting structure including a first mount arranged to locate on one lateral side of a conveyor belt and a second mount arranged to locate on the opposing lateral side of the conveyor belt, the first mount and the second mount being connected by upper tracks passing over an upper surface of the conveyor belt and lower tracks passing over a lower surface of the conveyor belt, whereby a conveyor belt condition monitoring apparatus can be introduced into the first mount or the second mount and then moved laterally across the belt by engagement with at least one of the upper and lower tracks.

Preferably each of the first and second mounts have an outer aperture within which the monitoring apparatus can be introduced. The outer aperture may be closed by a cover when not in use.

It is preferred that the cover is hinged to its mount, and moveable between a closed position wherein it limits access into the mount, and an open position whereby it provides a support surface for monitoring apparatus.

According to a third aspect of the present invention there is provided a method of monitoring conveyor belt condition, the method including the steps of providing a monitoring apparatus supporting structure, the supporting structure including a first mount arranged to locate on one lateral side of a conveyor belt and a second mount arranged to locate on the opposing lateral side of the conveyor belt, the first mount and the second mount being connected by upper tracks passing over an upper surface of the conveyor belt and lower tracks passing over a lower surface of the conveyor belt; introducing a monitoring apparatus into the first mount and moving it along the tracks to monitor part of the conveyor belt surface; removing the monitoring apparatus from the first mount; introducing the monitoring apparatus into the second mount and moving it along the tracks to monitor another part of the conveyor belt surface.

According to a fourth aspect of the present invention there is provided a sensor arrangement for determining conveyor belt thickness, the arrangement including at least one first sensor arranged to determine a distance from a base position to a face of the conveyor belt and a second sensor arranged to determine a distance from the base position to a core of the conveyor belt, wherein the second sensor is located around the first sensor.

The first sensor may be an ultrasonic sensor, and the second sensor is preferably an eddy-current sensor.

It is preferred that the second sensor is annular, with the first sensor directed through a center of the second sensor.

BRIEF DESCRIPTION OF THE DRAWINGS

It will be convenient to further describe the invention with reference to preferred embodiments of the present invention. Other embodiments are possible, and consequently the particularity of the following discussion is not to be understood as superseding the generality of the preceding description of the invention. In the drawings.

DETAILED DESCRIPTION OF PREFERRED EMBODIMENTS

Figure 1:
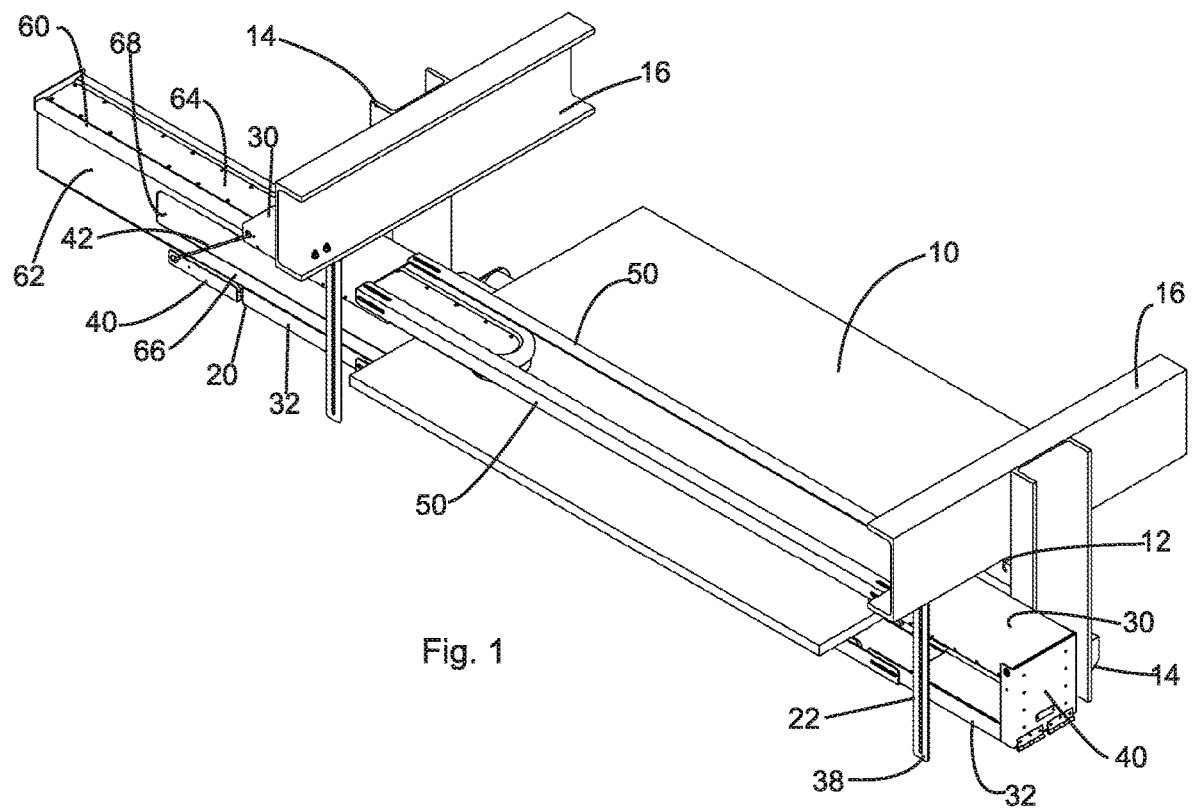
FIG. 1 is a perspective of a conveyor belt monitoring apparatus and associated supporting structure in accordance with the present invention.
Figure 2:
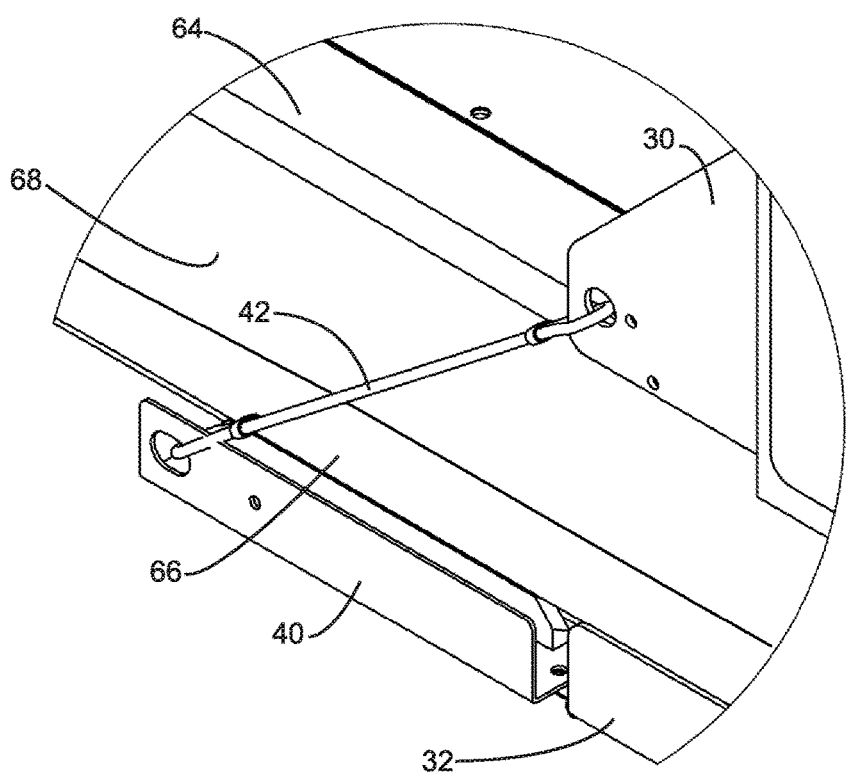
FIG. 2 is an enlarged view of an end of a mount within the supporting structure of FIG. 1.
Figure 3:
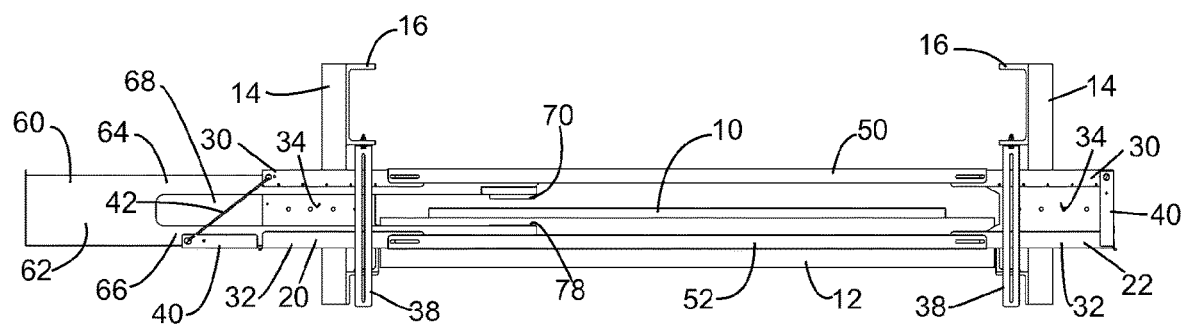
FIG. 3 is a cross section through the apparatus and supporting structure of FIG. 1.
Figure 4:
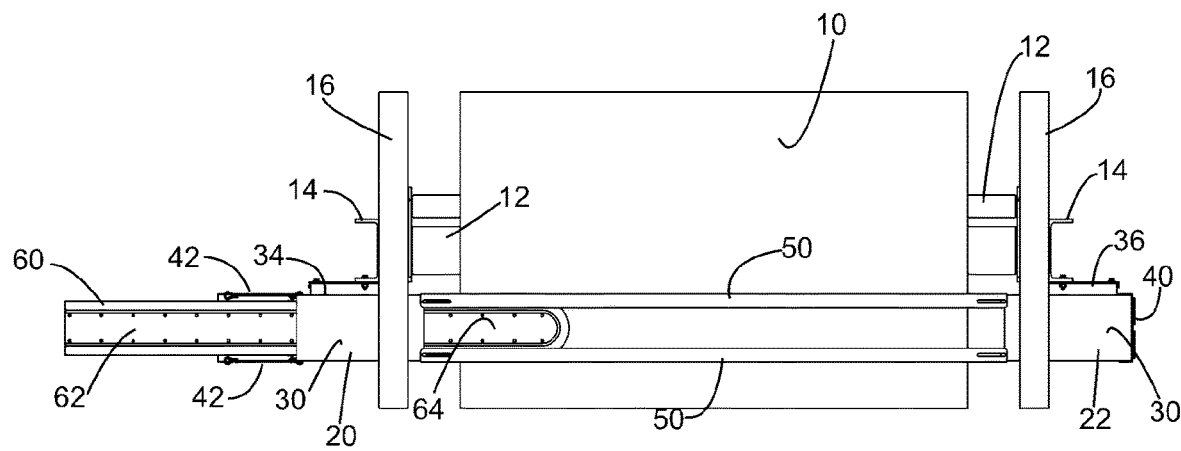
FIG. 4 is a plan view of the apparatus and supporting structure of FIG. 1.

Referring to the Figures, there is shown a portion of a conveyor belt 10. The conveyor belt 10 is supported on rollers 12, which are mounted on riser support bars 14. Horizontal supporting channels 16 extend above the conveyor belt 10 on either side, running parallel with a direction of travel of the conveyor belt 10.

A supporting structure for conveyor belt monitoring equipment has a first mount 20 located on a first side of the conveyor belt 10, and second mount 22 located on a second side of the conveyor belt 10. The first mount 20 is directly opposite the second mount 22 across the conveyor belt 10. The second mount 22 is a mirror-image of the first mount 20, and the following description applies equally to both mounts 20, 22.

The mounts 20, 22 are generally C-shaped in cross section, with each having an upper flange 30, a lower flange 32, and a connecting web 34 at the rear of the respective mount 20, 22. The connecting web 34 is fixed to a riser support bar 14 by means of a bracket 36.

A vertical guide 38 extends across a front of each mount 20, 22, being bolted to outer lips of the upper flange 30 and the lower flange 32. The vertical guide 38 has an attachment portion at an upper end thereof, arranged to bolt to a horizontal supporting channel 16.

In this way, the first mount 20 and the second mount 22 can be fixed to the supporting structure of the conveyor belt 10 such that the respective upper flanges 30 and the lower flanges 32 are held in horizontal orientation.

A respective cover 40 is mounted at an outer end of each mount 20, 22. The cover 40 is hinged to the lower flange 32, and is moveable between a closed configuration as shown in relation to the second mount 22 and an open configuration as shown in relation to the first mount 20.

In the closed configuration, the cover 40 extends from the lower flange 32 to the upper flange 30. In the open configuration, the cover 40 acts as a continuation of the lower flange 32. Supporting tensile elements 42 are provided to extend from the upper flange 30 to an outer edge of the cover 40 in its open configuration, ensuring that the cover 40 is held in a horizontal position in the open configuration.

A pair of upper tracks 50 extend between the upper flange 30 of the first mount 20 and the upper flange 30 of the second mount 22. The upper tracks 50 are spaced apart by the width of the upper flanges 30.

Similarly, a pair of lower tracks 52 extend between the lower flange 32 of the first mount 20 and the lower flange of the second mount 22. The lower tracks 52 are parallel to, and vertically spaced from, the upper tracks 50.

It will be appreciated that the upper and lower tracks 50, 52 combine with the first and second mounts 20, 22 to form a four-sided 'box' through which the conveyor belt 10 travels.

The arrangement is such that the supporting structure for conveyor belt monitoring equipment can be maintained in position around the conveyor belt 10 permanently, with both covers 40 retained in their closed positions.

When monitoring is required, a conveyor belt monitor 60 can be introduced.

The conveyor belt monitor 60 is generally elongate, with a body portion 62 at a first elongate end and two arms, an upper arm 64 and a lower arm 66, extending away from the body portion 62 towards the second elongate end.

The body portion 62 has a cross sectional size and shape similar to the cross sectional shape of the mounts 20, 22. The upper arm 64 and the lower arm 66 are parallel to each other, and spaced apart by a gap 68. The he lower arm 66 is arranged to engage with the lower tracks 52. The upper tracks 50 act to hold the supporting structure steady during movement of the conveyor belt monitor.

The conveyor belt monitor 60 is preferably made from a material which will maintain its size and rigid shape despite changes in surrounding temperature. The conveyor belt monitor 60 of the preferred embodiment is made from a composite carbon fibre material.

Figure 5:
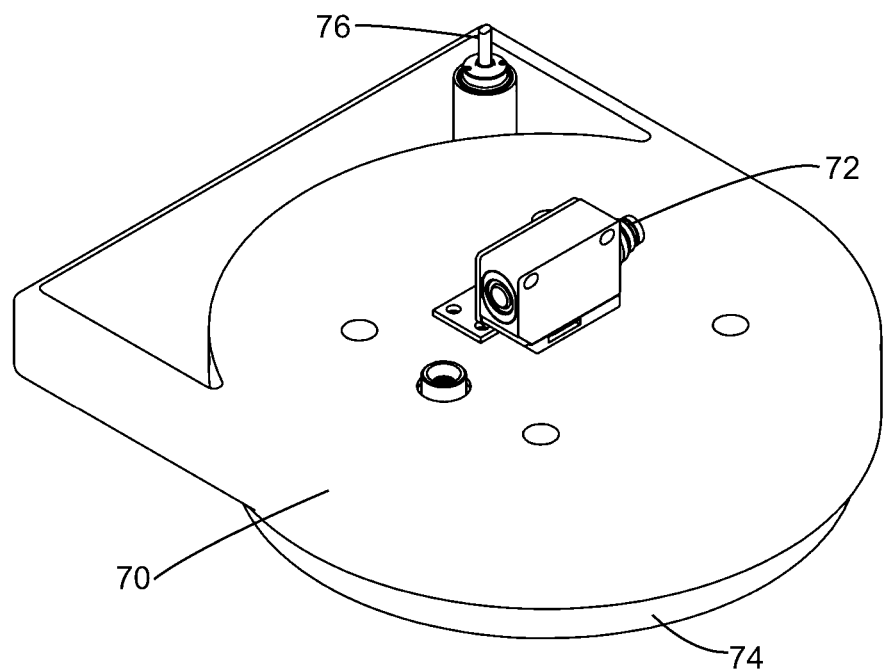
FIG. 5 is a perspective of a sensor unit from within the apparatus of FIG. 1.
Figure 6:
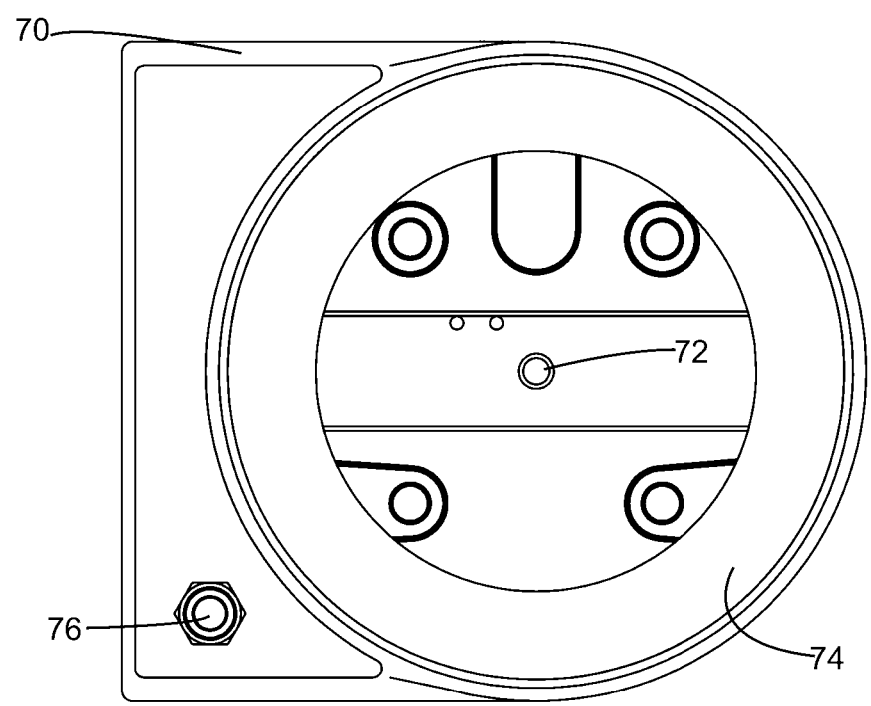
FIG. 6 is an underview of the sensor unit of FIG. 5.
Figure 7:
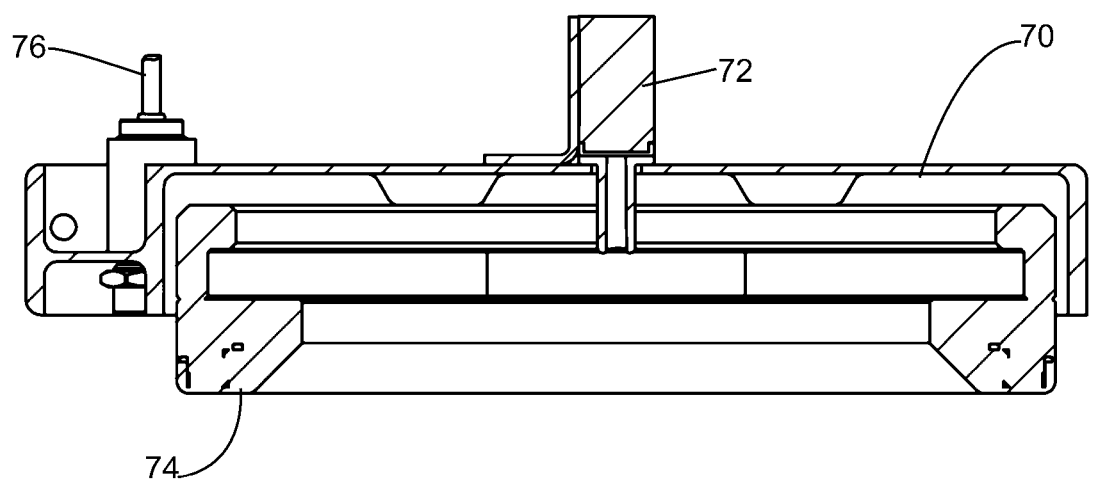
FIG. 7 is a cross section through the sensor unit of FIG. 5.

The upper arm 64 has a sensor unit 70 located on a lower face thereof, near the second elongate end. The sensor unit 70 is shown in greater detail in FIGS. 5 to 7.

The sensor unit 70 has a first sensor 72 centrally located on the sensor unit 70. The first sensor 72 is an ultrasonic sensor, directed towards the lower arm 66.

The sensor unit 70 has an annular second sensor 74 located on a lower face thereof. The second sensor 74 is an eddy-current sensor, which has been formed in an annulus. The arrangement is such that the first sensor 72 is located at the center of the annulus formed by the second sensor 74.

The sensor unit 70 has a third sensor 76 located at a periphery thereof, outside the annulus of the second sensor 74. The third sensor 76 is an infra-red pyrometer.

The lower arm 66 has an additional first sensor 78 located on an upper face thereof, near the second elongate end. The additional first sensor 78 is an ultrasonic sensor similar to the first sensor 72, directed towards the upper arm 64.

The body portion 62 includes a further sensor (not shown), which is an ultrasonic sensor directed between the upper arm 64 and the lower arm 66.

In use, the cover 40 of the first mount 20 is opened, and the monitor 60 introduced into the first mount 20 with the upper and lower arms 64, 66 pointed across the conveyor belt 10. The upper arm 64 locates under the upper flange 30, and engages with the upper tracks 50. The lower arm 66 locates atop the lower flange 32 and the opened cover 40, and engages with the lower tracks 52.

The monitor 60 can then be moved across the conveyor 10. During this movement the first sensor 72 and the additional first sensor 78 can be used to determine the overall thickness of the conveyor 10 by the simple mechanism of subtracting the two sensor-to-surface measurements from a known, fixed distance between the sensors 72, 78. The second sensor 74 can be used in conjunction with the first sensors 72, 78 to measure the thickness of the upper side of the conveyor belt 10. The lateral position of the thickness measurements, that is the distance from an edge of the conveyor belt to the measurement being taken, can be determined using the further sensor to determine the distance from the body portion 62 to an edge of the conveyor belt 10. It will be appreciated that lateral distance from the first sensor 72 to the further sensor is fixed.

It will be appreciated that the second sensor 74 determines a distance from the second sensor 74 to a central metallic core of the conveyor belt 10. This distance is determined as an average distance of an area approximately three times the diameter of the second sensor 74, centered at a point corresponding to the first sensor 72. Once the first and second sensors 72, 74 are calibrated, the distance from the first sensor 72 to a surface of the belt 10 can be subtracted from the distance measured by the second sensor 74 to provide a measurement of thickness from core to belt surface. The use of an annular eddy current sensor allows the sensor unit 70 to calculate an average thickness from core to belt surface accurately even if the belt 10 is angled relative to the upper arm 64. It is preferred that the first sensor 72 and the second sensor 74 are calibrated together using a base of the second sensor 74 as a measurement zero point of reference.

The third sensor 76 provides a measurement of belt temperature. This allows for a calculation of expected thermal expansion of the belt, so that this can be taken into account when evaluating belt condition based on thickness measurements.

Once measurement is completed (generally of one half of the conveyor belt 10), the monitor 60 can be removed from the first mount 20, and inserted instead into the second mount 22. The same process will record measurement of the second half of the conveyor belt 10.

The monitor 60 can then be moved to another supporting structure for another belt, to carry out measurements accordingly.

Modifications and variations as would be apparent to a skilled addressee are deemed to be within the scope of the present invention.

The invention claimed is:

1. A conveyor belt condition monitoring apparatus, comprising:
   a body portion; and
   two arms parallel to each other, the two arms extending away from the body portion and defining a gap therebetween through which a conveyor belt travels, each of the two arms comprising one or more first sensors arranged therein, at least one of the first sensors being oriented towards an upper face of the conveyor belt, at least another one of the first sensors being oriented towards a lower face of the conveyor belt,
   wherein the two arms are configured to move across at least half of a width of the conveyor belt in a direction that is transverse to a direction in which the conveyor belt travels.

2. A conveyor belt condition monitoring apparatus as claimed in claim 1, wherein the body portion and the two arms are arranged to move relative to the conveyor belt in a direction that is perpendicular to the direction in which the conveyor belt travels.

3. A conveyor belt condition monitoring apparatus as claimed in claim 1, wherein each of the first sensors are configured to determine a distance from the one of the two arms in which the first sensor is arranged to a respective face of the conveyor belt toward which the first sensor is oriented.

4. A conveyor belt condition monitoring apparatus as claimed in claim 1, wherein the first sensors are ultrasonic sensors.

5. A conveyor belt condition monitoring apparatus as claimed in claim 1, wherein at least one of the two arms comprises a second sensor arranged to determine a distance from the one of the two arms in which the second sensor is arranged to a core of the conveyor belt.

6. A conveyor belt condition monitoring apparatus as claimed in claim 5, wherein the second sensor is an eddy-current sensor.

7. A conveyor belt condition monitoring apparatus as claimed in claim 5, wherein the second sensor locates around at least one of the first sensors.

8. A conveyor belt condition monitoring apparatus as claimed in claim 7, wherein the second sensor is annular, with at least one of the first sensors being directed through a center of the second sensor.

9. A conveyor belt condition monitoring apparatus as claimed in claim 1, wherein at least one of the two arms includes a third sensor arranged to determine the temperature of the conveyor belt.

10. A conveyor belt condition monitoring apparatus as claimed in claim 9, wherein the third sensor is an infra-red pyrometer.

11. A conveyor belt condition monitoring apparatus as claimed in claim 1, further comprising an additional edge detecting sensor.

12. A conveyor belt condition monitoring apparatus as claimed in claim 11, wherein the edge detecting sensor is associated with the body portion, and is arranged to determine a distance from the body portion to an edge of the conveyor belt.

13. A conveyor belt condition monitoring apparatus as claimed in claim 12, wherein the edge detecting sensor is an ultrasonic sensor.

14. A conveyor belt condition monitoring apparatus supporting structure, the supporting structure including comprising:
   a first mount arranged to locate on one lateral side of a conveyor belt;
   a second mount arranged to locate on an opposing lateral side of the conveyor belt;
   upper tracks passing over an upper surface of the conveyor belt; and
   lower tracks passing over a lower surface of the conveyor belt,
   wherein the first and second mounts are connected to each other by the upper tracks and the lower tracks,
   wherein the supporting structure is configured to have a conveyor belt condition monitoring apparatus introduced into the first mount or the second mount and then moved laterally across the conveyor belt by engagement with at least one of the upper and lower tracks.

15. A conveyor belt condition monitoring apparatus supporting structure as claimed in claim 14, wherein each of the first and second mounts have an outer aperture configured to have the monitoring apparatus introduced.

16. A conveyor belt condition monitoring apparatus supporting structure as claimed in claim 15, wherein the outer aperture is configured to be closed by a cover when not in use.

17. A conveyor belt condition monitoring apparatus supporting structure as claimed in claim 16, wherein the cover is hinged to a respective one of the first and second mounts, and is moveable between a closed position limiting access into the respective one of the first and second mounts, and an open position providing a support surface for the conveyor belt condition monitoring apparatus.

18. A method of monitoring a condition of conveyor belt, the method comprising:
   providing a monitoring apparatus supporting structure, the supporting structure comprising a first mount arranged to locate on one lateral side of a conveyor belt, a second mount arranged to locate on an opposing lateral side of the conveyor belt, upper tracks passing over an upper surface of the conveyor belt, and lower tracks passing over a lower surface of the conveyor belt, the first mount and the second mount being connected to each other by the upper tracks and the lower tracks;

introducing the conveyor belt condition monitoring apparatus into the first mount;

moving the conveyor belt condition monitoring apparatus laterally across the conveyor belt by engagement with at least one of the upper and lower tracks to monitor a part of a surface of the conveyor belt;

removing the conveyor belt condition monitoring apparatus from the first mount;

introducing the conveyor belt condition monitoring apparatus into the second mount and moving the conveyor belt condition monitoring apparatus laterally across the at least one of the upper and lower tracks to monitor another part of the surface of the conveyor belt.

19. A sensor arrangement for determining conveyor belt thickness, the arrangement comprising:

at least one first sensor arranged to determine a distance from a base position to a face of the conveyor belt; and a second sensor arranged to determine a distance from the base position to a core of the conveyor belt, wherein the second sensor is located around the first sensor.

20. A sensor arrangement as claimed in claim 19, wherein the first sensor is an ultrasonic sensor, and the second sensor is an eddy-current sensor.

21. A sensor arrangement as claimed in claim 19, wherein the second sensor is annular, with the first sensor directed through a center of the second sensor.

* * * * *